United States Patent [19]

Koch

[11] Patent Number: 4,545,698
[45] Date of Patent: Oct. 8, 1985

[54] CONNECTOR FOR DETACHABLE CONNECTION OF COMPONENTS OF FURNITURE OR THE LIKE AT RIGHT ANGLES TO EACH OTHER

[75] Inventor: Gerhard Koch, Nagold, Fed. Rep. of Germany

[73] Assignee: Hafele KG, Fed. Rep. of Germany

[21] Appl. No.: 578,135

[22] Filed: Feb. 8, 1984

[30] Foreign Application Priority Data

Mar. 18, 1983 [DE] Fed. Rep. of Germany ... 8307977[U]

[51] Int. Cl.⁴ ............................................. B25G 3/00
[52] U.S. Cl. .................................... 403/231; 403/381; 403/405.1; 403/407.1; 312/257 SK
[58] Field of Search ............... 403/407, 406, 405, 231, 403/266, 331, 381; 312/257 SK, 263; 248/188

[56] References Cited

U.S. PATENT DOCUMENTS

| | | | |
|---|---|---|---|
| 4,089,614 | 3/1978 | Harley | 403/407 |
| 4,127,353 | 11/1978 | Busse | 403/407 X |
| 4,131,376 | 12/1978 | Busse | 403/231 X |
| 4,236,848 | 12/1980 | Röck et al. | 403/406 |
| 4,353,663 | 10/1982 | Glickman | 403/231 X |
| 4,357,119 | 11/1982 | Pollitt | 403/231 |

FOREIGN PATENT DOCUMENTS

| | | | |
|---|---|---|---|
| 2548527 | 5/1977 | Fed. Rep. of Germany | 403/405 |
| 2855216 | 7/1979 | Fed. Rep. of Germany | 403/231 |
| 2033043 | 5/1980 | United Kingdom | 403/231 |

Primary Examiner—Cornelius J. Husar
Assistant Examiner—Todd G. Williams
Attorney, Agent, or Firm—Thomas W. Speckman

[57] ABSTRACT

A device for detachably connecting components disposed at right angles to each other having two fitting elements of which the first element is provided with a head section having laterally sloping wedge-shaped surfaces and the second element is provided with a dovetail-like groove into which the head of the first fitting element is accurately fitted so that in the assembled condition of the fitting the wedge-shaped faces of the head section are in secure contact with the inclined inner surfaces of the groove. The first fitting element is in the form of a wedge block adapted to be screwed to the first furniture component. The wedge-shaped faces of the wedge block and the mating side faces of the second fitting element are disposed at an acute angle to the first furniture component and the second fitting element is in the form of a mounting sleeve inserted into the desired surface of the second furniture component producing tightening forces in the plane of tension as the wedge faces are inserted into the groove mating with the side faces, thereby securely joining the two components toghether and while ensuring centering of the two fitting elements and definitive positioning of the joined furniture components.

14 Claims, 6 Drawing Figures

CONNECTOR FOR DETACHABLE CONNECTION OF COMPONENTS OF FURNITURE OR THE LIKE AT RIGHT ANGLES TO EACH OTHER

BACKGROUND OF THE INVENTION

1. Field of the Invention

This invention relates to a connector device for detachably connecting components of furniture or the like disposed at right angles to each other. The connector device has two connectible fitting elements of which the first element is provided with a head section having laterally sloping wedge-shaped surfaces and the second element is provided with a dovetail mortise or the like into which the head of the first fitting element is accurately fitted so that in the assembled condition of the fitting the wedge-shaped faces of the head section are in secure contact with the inclined inner surfaces of the mortise type groove. The first fitting element is in the form of a wedge block adapted to be screwed to the first furniture component. The wedge-shaped faces of the wedge block and the side faces of the second fitting element are disposed at an acute angle to the first furniture component. The second fitting element takes the form of a mounting sleeve inserted into the desired surface of the second furniture component.

2. Description of the Prior Art

A furniture fitting of this general type is disclosed in German Utility Model DE-GM No. 68 05 646. In this prior connecting device, however, the wedge faces of the first fitting element and the side faces of the groove of the second fitting element extend parallel to the first furniture component. A disadvantage of this prior fitting is that the fitting elements fail to be secured against displacement in the direction of insertion. Moreover, in the direction perpendicular to the direction of insertion, namely in the tightening plane which is the plane perpendicular to the groove base, no tightening action of the two fitting elements takes place. Thus, the tolerances of the wedge faces and of the side faces of the two fitting elements in engagement with each other must be kept relatively small, with the result that the fitting elements are required to be fastened to the furniture components with extreme care and accuracy in order to achieve an effective locking of the two fitting elements and thus the secure connection of the two furniture components.

A furniture fitting similar to the one referred to in the first paragraph above is known from German Patent DE-PS No. 26 42 488. The sloping wedge faces of the first fitting element and the inclined side faces of the groove of the second fitting element produce a locking effect in the direction of insertion and enable the two fitting elements to perform a tightening movement in the plane of tension. Since the wedge faces of the first fitting element and the side faces of the groove of the second fitting element form undercuts in the direction of insertion, the side faces of the groove are moved to the ends of two clamp members rotatably mounted in the second fitting element. Associated with the clamp members is an eccentric screw headed pin to enable the two clamp members to be pivoted. The eccentric pin causes the clamp members to be swung behind the wedge faces of the first fitting element and, as the eccentric screw is turned further, the fitting elements are secured to each other in the plane of the tensional forces.

This well known prior fitting requires, however, a complex and costly second fitting element. Moreover, the fitting elements have a certain play across the direction of the tightening forces which makes it difficult for the furniture components joined together to always remain in the same definitive position with respect to each other.

SUMMARY OF THE INVENTION

It is the object of the present invention to provide a furniture fitting of the type referred to in the foregoing, which fitting permits the tightening of the two fitting elements in the plane of tension and affords an automatic centering of the two fitting elements and thus a well defined positioning and tightening of the furniture components joined together.

This is accomplished according to the invention in that the first fitting element comprises a headed screw adapted to be screwed into the first furniture component holding the first fitting element tightly against the furniture surface, that the wedge-shaped faces of the wedge block and the side faces of the second fitting element are in the form of sections of inclined cylinders, that the wedge faces are convex and the side faces are concave, and that the first fitting element has formed thereon a cover plate to cover the second fitting element and the wedge block of the first fitting element.

The convexly curved wedge faces of the first fitting element and the correspondingly concavely curved lateral surfaces of the groove of the second fitting element ensure that the two fitting elements not only are automatically centered as they are being installed, but also that a tightening movement is executed in the plane of tension. While the cover plate primarily serves to cover the wedge block of the first fitting element along with the second fitting element, it also serves as a stop and safeguards the two fitting elements in their direction of insertion. Since the first fitting element is attached to the first furniture component by means of a threaded screw, the wedge faces of the first fitting element always assume a definitive position with respect to the desired surface of the first furniture component. The wedge faces of the wedge block and the lateral surfaces of the grooves, being at an acute angle to this upper surface of the first furniture component, produce a sufficiently long tightening distance in view of the available depth of the second fitting element inserted in a blind hole provided in the second furniture component. Moreover, the wedge block of the first fitting element is always in the proper position relative to the direction of rotating the screw since it is adjustable independently of the screw.

To fasten the first fitting element on the first furniture component, one embodiment provides that the head of the screw joins the threaded shank by way of a shoulder section, and that the wedge block is provided with a receptacle in parallel with the cover plate, which receptacle has offset sections to accommodate the shank, the shoulder and the head of the screw.

The wedge faces of the wedge block of the first fitting element and the side faces of the groove of the second fitting element are somewhat enlarged due to the convexly curved wedge faces of the first fitting element and the correspondingly concavely curved side faces of the groove of the second fitting element, which is of advantage in tightening the two fitting elements.

According to another embodiment, the wedge block is provided with a cutout for the head of the screw, which cutout extends up to the cover plate so that the first fitting element can have a uniform wall thickness which is of advantage in its production by injection molding.

Tightening of the screw, and thus fastening of the first fitting element to the first furniture component, is facilitated by the screw head being provided in its head with a receptacle for receiving tools.

In order for the cover plate to be in closest possible engagement with the upper surface of the second furniture component, one embodiment provides that the height of the wedge block measured from the inner side of the cover plate corresponds to the depth of the groove cut into the second fitting element.

One embodiment of the second fitting element is characterized in that the element takes the form of a hollow cylinder which is provided with a continuous longitudinal slot for inserting the wedge block of the first fitting element. This embodiment permits ease of production of the second fitting element by injection molding.

An additional safeguarding of the fitting elements movement counter to the direction of insertion is attained by the side walls of the insertion slot provided on the second fitting element having transversely extending ribs and the opposing side faces of the wedge block of the first fitting element being provided with transversely directed grooves.

Alignment of the second fitting element in the cavity provided in the second furniture component is achieved according to another embodiment, by the second fitting element being provided with approximately diametrically arranged cutouts in the front face of the hollow cylinder facing away from the cover plate of the first fitting element, which cutouts are located adjacent the base of the groove in the direction toward the insertion slot. The groove base is formed of diagonal trusses. These cutouts are suitable for holding an installation tool or a device by which the second fitting element is held in its proper angular position.

BRIEF DESCRIPTION OF THE DRAWING

The invention will be further described with reference to a representative embodiment illustrated in the drawings, in which.

DESCRIPTION OF PREFERRED EMBODIMENTS

Figure 1:
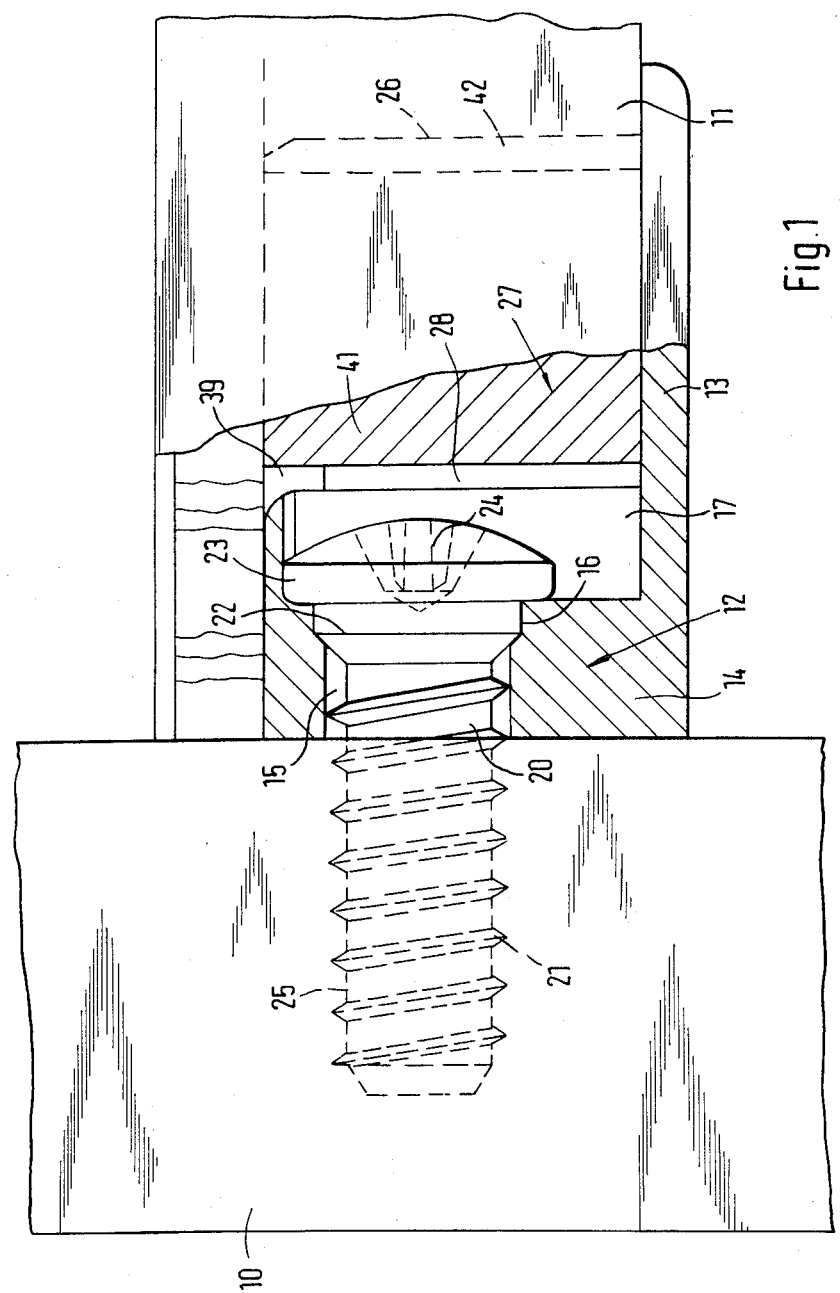
FIG. 1 is a partial sectional side view of two panel shaped furniture components which are joined together by fitting elements according to the invention.
Figure 2:
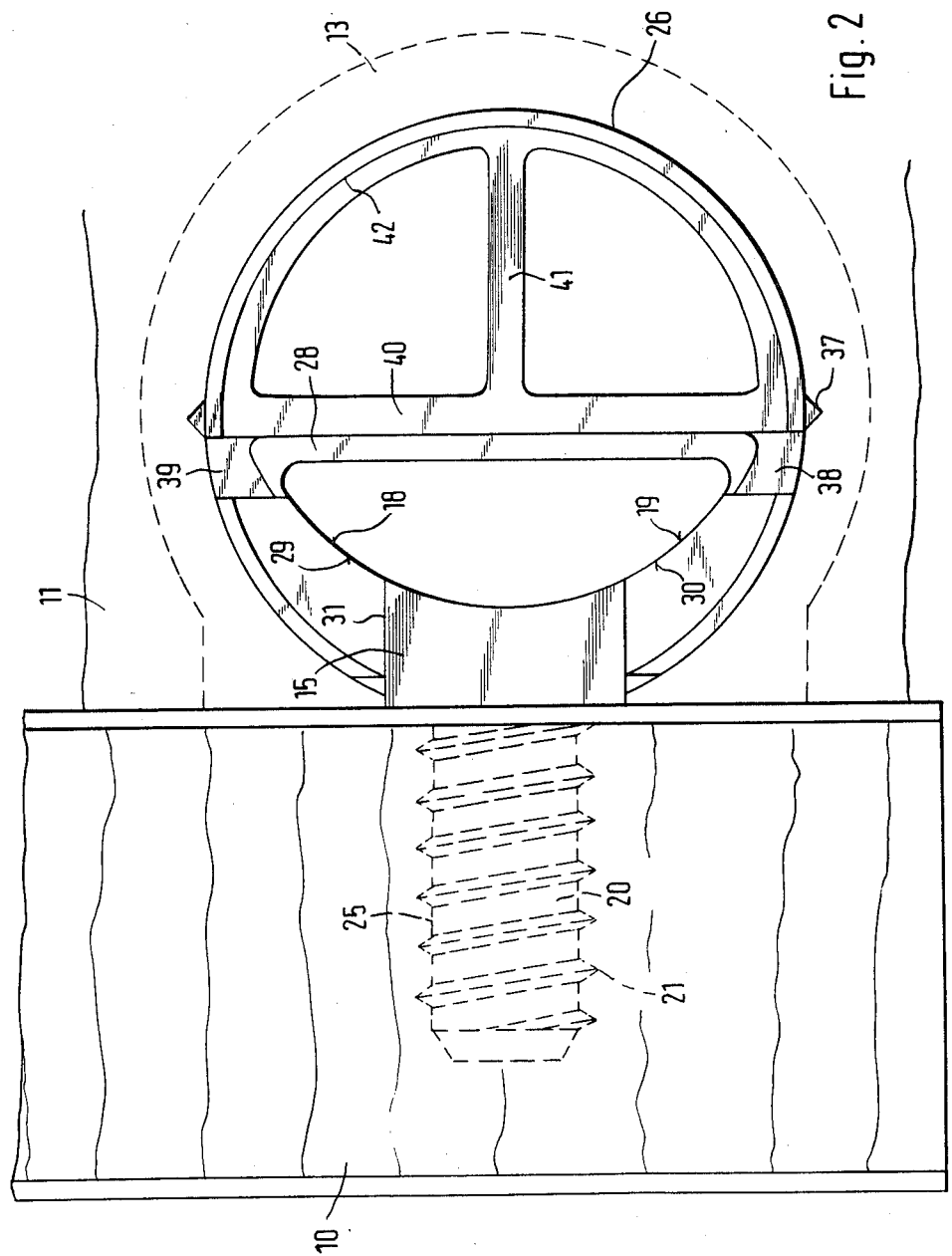
FIG. 2 illustrates the connection of FIG. 1 in a plan view of the front face of the second fitting element facing away from the first fitting element.
Figure 3:
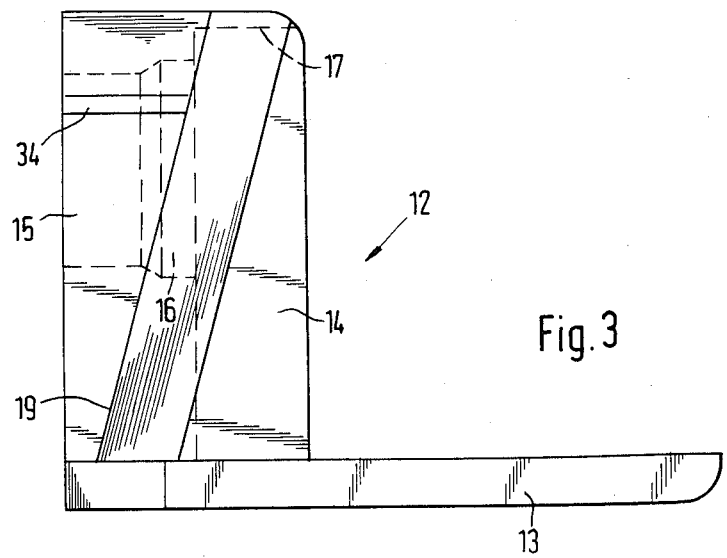
FIG. 3 is a side view of the first fitting element.
Figure 4:
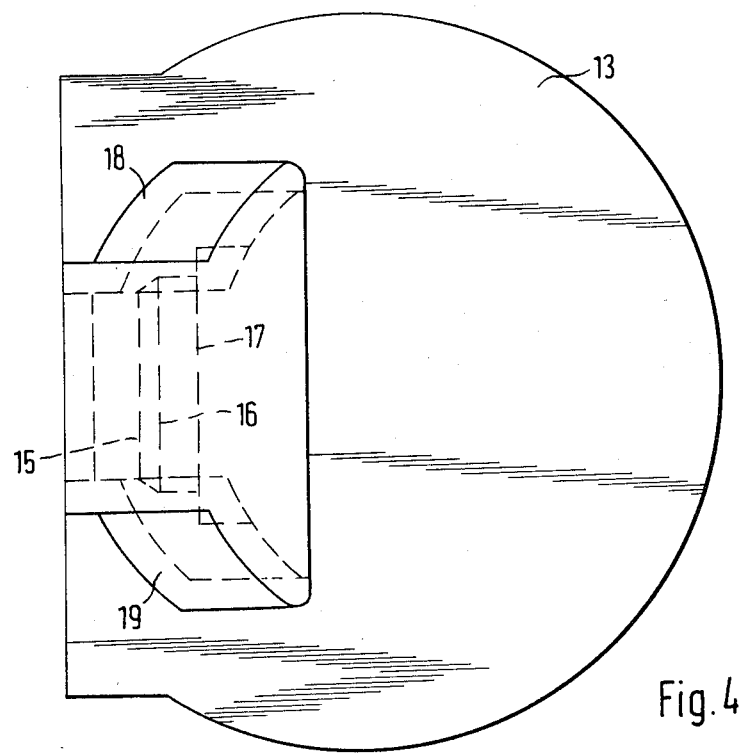
FIG. 4 shows the fitting element of FIG. 3 in a top plan view of the wedge block.

In the embodiment illustrated in FIGS. 1 to 6, the two panel shaped furniture components 10 and 11 are joined together in a perpendicular relationship to each other. Furniture component 10 is provided with a cavity or blind hole 25 into which is threadedly inserted the shank of pin or screw 20 having screw thread 21 thereon. Blind hole 25 is approximately dimensioned to accommodate screw shank 20 so as to enable screw threaded end 21 to become firmly anchored in the wall of the blind hole. Screw 20 serves to fasten first fitting element 12, as is shown in FIGS. 3 and 4, to first furniture component 10. First fitting element 12 includes cover plate 13 on the inner side of which is formed wedge block 14. Receptacle 15 is provided in wedge block 14 in parallel with cover plate 13. Receptacle 15 has offset section 16 which merges with cutout 17 in the of wedge block 14. Receptacle 15, including offset section 16, serves to receive screw threaded shank 21 of pin or screw 20 along with stepped section 22 adjacent head 23. Screw head 23 abuts against the rear wall of cutout 17. Wedge block 14 and cover plate 13 terminate flush and are in alignment with the surface opposite the first furniture component, forming an abutment for the first furniture component. Wedge block 14 has lateral wedge faces 18 and 19 which are, as is shown in FIG. 3, at an acute angle with first furniture component 10. The distance from first furniture component 10 is the smallest in the region of cover plate 13. For centering, wedge faces 18 and 19 are in the form of inclined cylindrical sections, with their convex sides facing first furniture component 10.

Figure 5:
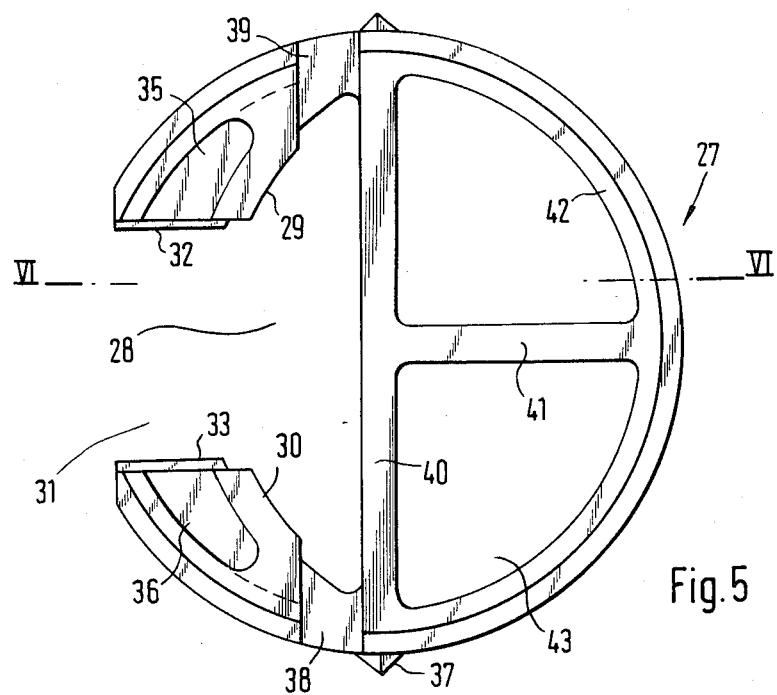
FIG. 5 illustrates the second fitting element in a plan view of the front facing the cover plate of the first fitting element.
Figure 6:
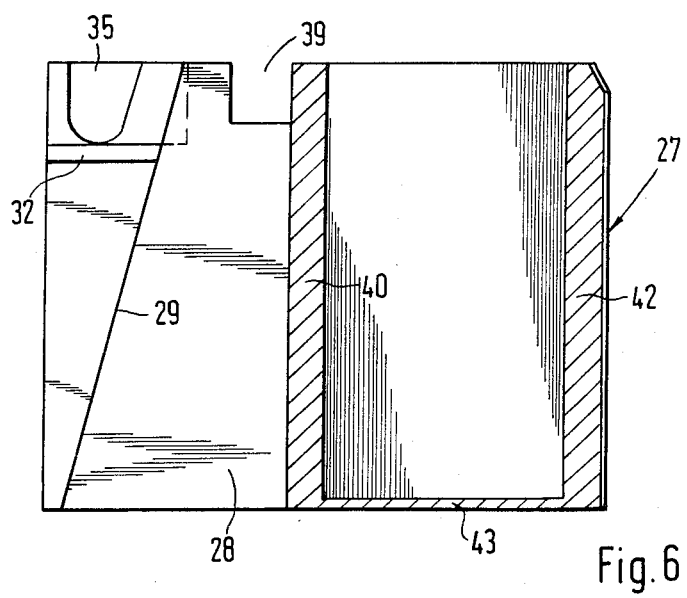
FIG. 6 is a sectional view of the second fitting element according to FIG. 5, taken along the line VI—VI.

Drilled into the upper surface of second furniture component 11 is blind hole 26 into which is inserted second fitting element 27, shown in FIGS. 5 and 6. Second fitting element 27 comprises hollow cylinder 42 having continuous longitudinal slot 31 therein for receiving wedge block 14 of first fitting element 12. Adjacent insertion slot 31 in hollow cylinder 42 are formed the concavely curved side faces 29 and 30 which conform to the inclination and curvature of wedge faces 18 and 19 on wedge block 14 of first fitting element 12 and form inclined hollow cylindrical sections. Side faces 29 and 30, in combination with insertion slot 31, form groove or channel 28 for wedge block 14 including its wedge faces 18 and 19. The groove base or bottom is formed by strut 40 which runs approximately diagonal and simultaneously serves to reinforce hollow cylinder 42. Perpendicularly branching off from strut 40 is strut 41 which, being radially directed, likewise contributes to a stiffening of hollow cylinder 42. Formed on the periphery of hollow cylinder 42 are barbs or catches 37 to retain second fitting element 27 in blind bore 26 of second furniture component 11.

Second fitting element 27 is provided on its front side facing away from cover plate 13 of first fitting element 12 with approximately diametrically arranged cutouts 38 and 39 in hollow cylinder 42. These cutouts 38 and 39 assist in the alignment of second fitting element 27 as it is driven into blind hole 26. Side faces 29 and 30 formed on the inner surface of hollow cylinder 42 are at the greatest distance from its circumference at the front of hollow cylinder 42. Cutouts 35 and 36 in this front side have the effect of reducing the wall thickness in these areas so that manufacture of the unit by injection molding is facilitated.

Molded onto the side walls of insertion slot 31 are transversely directed ribs 32 and 33 while wedge block 14 is provided with correspondingly transverse grooves 34 exteriorly of wedge faces 18 and 19 so that an interlocking with play is effected between groove 28 of second fitting element 27 and wedge block 14 of first fitting element 12. This is beneficial in that it guides the two fitting elements 12 and 27 in the direction of insertion. Likewise, the stop constituted by cover plate 13 in the direction of insertion contributes to the stability of the interlocked condition of fitting elements 12 and 27. Second fitting element 27 may be sealed off outside groove 28 at the front facing cover plate 13 of first fitting element 12 by end wall 43.

As wedge block 14 with its wedge faces 18 and 19 is inserted into groove 28 having side faces 29 and 30, fitting elements 12 and 27 are continuously adjusted in the plane of tension and furniture components 10 and 11 are tightly fastened to each other. The adjusting path and thus the tightening distance depends on how far wedge block 14 is pushed into groove 28. Cover plate 13 serves to cover up wedge block 14 and the second fitting element in a neat and orderly fashion.

The convexly curved wedge faces 18 and 19 of wedge block 14 and the concavely curved side faces 29 and 30 of groove 28 bring about an automatic centering of the two fitting elements during the tightening action so that the position of the furniture components to each other is positively defined.

I claim:

1. A connector for detachably connecting components disposed at right angles to each other, said device comprising two fitting elements of which a first element is provided with a head section having laterally sloping wedge-shaped faces and a second fitting element is provided with a sloping groove into which said head of said first fitting element is accurately fitted so that in the assembled condition of said fitting elements said wedge-shaped surfaces of said head section are in secure contact with side faces of said groove, said first fitting element being in the form of a wedge block adapted to be screwed to a first component, said wedge-shaped surfaces of said wedge block and said side faces of said second fitting element being disposed at an acute angle to said first component, said second fitting element being in the form of a mounting sleeve inserted into the desired surface of said second component, characterized in that said first fitting element (12) comprises a screw (20) having a head (23) adapted to be screwed into said first component (10) to firmly hold said first element (12) thereto, that said wedge-shaped faces (18, 19) of said wedge block (14) and said side faces (29, 30) of said second fitting element (27) are in the form of sections of an inclined cylinder, that said wedge faces (18, 19) are convex and said side faces (29, 30) are concave to matchingly engage said wedge faces (18, 19), and that said first fitting element (12) has formed thereon a cover plate (13) to cover said second fitting element (27) and said wedge block (14) of said first fitting element (12).

2. A connector according to claim 1, characterized in that said head (23) of said screw (20) is joined to a threaded shank (21) by a shoulder section (22), and that said wedge block (14) is provided with a receptacle (15) parallel with said cover plate (13), said receptacle (15) having cutouts (16, 17) to accommodate said shank (21), said shoulder (22) and said head (23) of said screw (20).

3. A connector according to claim 2, characterized in that the said wedge block (14) is provided with a cutout (17) for said head (23) of said screw (20), said cutout extending to said cover plate (13).

4. A connector according to claim 3, characterized in that said head (23) of said screw (20) is provided on its face with a receptacle (24) for holding tools.

5. A connector according to claim 4, characterized in that the height of said wedge block (14) measured from the inner side of said cover plate (13) corresponds to the depth of groove (28) cut into said second fitting element (27).

6. A connector according to claim 5, characterized in that said second element (27) takes the form of a hollow cylinder (42) which is provided with a continuous insertion slot (31) for inserting said wedge block (14) of said first fitting element (12), that the area of said hollow cylinder (42) adjacent said insertion slot (31) has formed on its inner surface inclined side faces (29, 30) forming said groove (28), and that said hollow cylinder (42) is reinforced outside said groove (28) by struts (40, 41) projecting from the center axis of said hollow cylinder (42).

7. A connector according to claim 6, characterized in that the side walls of said insertion slot (31) in said second fitting element (27) have transversely extending ribs (32, 33) thereon and said wedge shape faces of said wedge block (14) of said first fitting element (12) are provided with loosely fitting engageable transversely directed grooves (34).

8. A connector according to claim 7, characterized in that said second fitting element (27) is provided on the front face of said hollow cylinder (42) facing away from said cover plate (13) of said first fitting element (12) with approximately diametrically arranged cutouts (38, 39) which are located adjacent the base of said groove (28) in the direction toward said insertion slot (31), and that said groove base is formed by said diagonal strut (40).

9. A connector according to claim 1, characterized in that the said wedge block (14) is provided with a cutout (17) for said head (23) of said screw (20), said cutout extending to said cover plate (13).

10. A connector according to claim 1, characterized in that said head (23) of said screw (20) is provided on its face with a receptacle (24) for holding tools.

11. A connector according to claim 1, characterized in that the height of said wedge block (14) measured from the inner side of said cover plate (13) corresponds to the depth of groove (28) cut into said second fitting element (27).

12. A connector according to claim 1, characterized in that said second element (27) takes the form of a hollow cylinder (42) which is provided with a continuous insertion slot (31) for inserting said wedge block (14) of said first fitting element (12), that the area of said hollow cylinder (42) adjacent said insertion slot (31) has formed on its inner surface inclined side faces (29, 30) forming said groove (28), and that said hollow cylinder (42) is reinforced outside said groove (28) by struts (40, 41) projecting from the center axis of said hollow cylinder (42).

13. A connector according to claim 1, characterized in that said second element (27) takes the form of a hollow cylinder (42) which is provided with a continuous insertion slot (31) for inserting said wedge block (14) of said first fitting element (12), the side walls of said insertion slot (31) in said second fitting element (27) have transversely extending ribs (32, 33) thereon and said wedge shape faces of said wedge block (14) of said first fitting element (12) are provided with loosely fitting engageable transversely directed grooves (34).

14. A connector according to claim 1, characterized in that said second fitting element (27) is provided on the front face of said hollow cylinder (42) facing away from said cover plate (13) of said first fitting element (12) with approximately diametrically arranged cutouts (38, 39) which are located adjacent the base of said groove (28) in the direction toward said insertion slot (31), and that said groove base is formed by said diagonal strut (40).

* * * * *